United States Patent
Son et al.

(10) Patent No.: US 7,965,233 B2
(45) Date of Patent: Jun. 21, 2011

(54) APPARATUS AND METHOD FOR SUPPORTING ASSISTED GLOBAL POSITIONING SYSTEM DURING EMERGENCY SERVICE IN A COMMUNICATION SYSTEM

(75) Inventors: Hyung-Chul Son, Suwon-si (KR); Tae-Ik Song, Suwon-si (KR); Ju-Young Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 249 days.

(21) Appl. No.: 12/268,029

(22) Filed: Nov. 10, 2008

(65) Prior Publication Data
US 2009/0167600 A1    Jul. 2, 2009

(30) Foreign Application Priority Data
Nov. 9, 2007   (KR) .................. 10-2007-0114224

(51) Int. Cl.
*G01S 19/05* (2010.01)
*G01S 19/17* (2010.01)

(52) U.S. Cl. ................ 342/357.42; 342/357.55
(58) Field of Classification Search ............ 342/357.42, 342/357.43, 357.55, 357.64, 357.74, 357.75; 701/207, 213
See application file for complete search history.

(56) References Cited

U.S. PATENT DOCUMENTS

2006/0121914 A1*  6/2006  Kim et al. ................. 455/456.1
2006/0194566 A1*  8/2006  Oesterling ................ 455/404.1

* cited by examiner

*Primary Examiner* — Dao L Phan
(74) *Attorney, Agent, or Firm* — The Firm Law Firm, P.C.

(57) ABSTRACT

An apparatus and method for supporting an Assisted Global Positioning System (AGPS) during emergency service in a communication system are provided. The system includes a client, an integration location server, and a dual mode Mobile Station (MS). The client requests MS location information for emergency service. The integration location server receives MS access information and sends a location information request. The dual mode MS receives the location request, activates a second communication modem, and performs an AGPS operation with the integration location server.

22 Claims, 10 Drawing Sheets

APPARATUS AND METHOD FOR SUPPORTING ASSISTED GLOBAL POSITIONING SYSTEM DURING EMERGENCY SERVICE IN A COMMUNICATION SYSTEM

PRIORITY

This application claims priority under 35 U.S.C. §119(a) to a Korean Patent Application filed in the Korean Intellectual Property Office on Nov. 9, 2007 and assigned Serial No. 10-2007-0114224, the contents of which are incorporated herein by reference.

BACKGROUND OF THE INVENTION

1. Field of the Invention

The present invention relates generally to an apparatus and method for supporting an Assisted Global Positioning System (AGPS) during an emergency service, and more particularly, to an apparatus and method for supporting an AGPS during the emergency service in a dual mode Mobile Station (MS).

2. Description of the Related Art

Natural disasters such as forest fires, typhoons, floods, etc., have given an increased importance to wireless emergency services. The wireless emergency service assists in emergency rescue of a person in an emergency circumstance and provides an emergency alert for a specific disastrous area. The wireless emergency service can be divided into a wireless emergency rescue service and a wireless emergency alert service. The wireless emergency rescue service is a service that detects a location of a wireless mobile communication user in an emergency and supports safe rescue of the user. The wireless emergency alert service is a service that supports delivery of emergency alerts, such as typhoon alerts, impending earthquake and tidal wave warnings, etc., to wireless subscribers within a specific geographical area.

The Federal Communications Commission (FCC) has defined Enhanced E911 (E911) regulations for providing a location of an MS through a network based method or an MS based method when there is an emergency call from the MS. In order to implement this, the $3^{rd}$ Generation Partnership Project 2 (3GPP2) has introduced an AGPS corresponding to the MS based method, but current broadband wireless communication system (e.g., the Institute of Electrical and Electronics Engineers (IEEE) 802.16) fail to define AGPS standards. A broadband wireless communication service provider is in need of an AGPS function for the purpose of a Location Based Service (LBS), including E911 emergency service. In particular, the service provider has considered a scheme for supporting an AGPS function during E911 emergency service in a dual mode MS that supports a broadband wireless communication system and a Code Division Multiple Access (CDMA) system.

As described above, a current broadband wireless communication system has no definition of the AGPS standards for E911. Also, a broadband wireless communication system MS manufacturer seeks to realize an AGPS function in a broadband communication modulator/demodulator (modem) but suffers a difficulty due to, for example, patent royalty problems. In the case of CDMA, the 3GPP2 provides the AGPS standards for E911 and, generally, a CDMA modem already includes an AGPS function. Accordingly, when there is a request for E911 emergency service in a dual mode MS supporting a broadband wireless communication system/CDMA system, it can operate an AGPS through the CDMA modem and provide a location of an MS.

In general, when a modem supporting one communication mode is in operation, a dual mode MS inactivates a modem supporting a different communication mode to reduce power consumption. For example, a dual mode MS supporting a broadband wireless communication system and a CDMA communication system inactivates and disables a communication mode supporting a CDMA communication system, at a time a communication mode for accessing a broadband wireless communication system is in operation. Inversely, when a CDMA communication modem is in operation, a broadband communication modem does not operate.

Thus, an AGPS can operate during E911 emergency service only when a CDMA communication mode is in operation, but it is impossible to perform AGPS during E911 emergency service in a state where a CDMA modem is inactivated and only a broadband communication modem is in operation.

SUMMARY OF THE INVENTION

The present invention has been made to address at least the above problems and/or disadvantages and to provide at least the advantages described below. Accordingly, one aspect of the present invention provides an apparatus and method for supporting an Assisted Global Positioning System (AGPS) during Enhanced 911 (E911) emergency service in a state where a modem of an AGPS enable mode is inactivated, when AGPS operation is possible only in one communication mode in a dual mode Mobile Station (MS).

The above aspects are achieved by providing an apparatus and method for supporting an AGPS during emergency service in a communication system.

According to one aspect of the present invention, a communication system for supporting an AGPS during emergency service is provided. The system includes a client, an integration location server, and a dual mode MS. The client requests MS location information for emergency service. The integration location server receives access information on a corresponding MS from an authentication server in response to the MS location information request, and sends a location information request to the corresponding MS. The dual mode MS receives the location information request through a first communication modem, activates a second communication modem, and performs an AGPS operation with the integration location server.

According to another aspect of the present invention, a method for supporting an AGPS during emergency service in a communication system is provided. MS location information for emergency service is requested by the client. Access information on a corresponding MS is received by an integration location server from an authentication server in response to the MS location information request. A location information request is sent to the corresponding MS. The location information request is received by a dual mode MS through a first communication modem. A second communication modem is activated, and an AGPS operation is performed with the integration location server.

According to a further another aspect of the present invention, an apparatus for supporting an AGPS during emergency service in a dual mode MS is provided. The apparatus includes a first communication modem, a dual mode modem controller, and a second communication modem. The first communication modem accesses a first communication network and receives an MS location information request for emergency service. The dual mode modem controller activates the second communication modem when the MS location information request for emergency service is received. The second communication modem accesses a second communication network in response to the MS location information request for emergency service and performs an AGPS operation.

According to an additional aspect of the present invention, a method for supporting an AGPS during emergency service in a dual mode MS is provided. A first communication network is accessed through a first communication modem and an MS location information request is received for emergency service. When the MS location information request for emergency service is received, a second communication modem is activated. A second communication network is accessed in response to the MS location information request for emergency service and an AGPS operation is performed.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
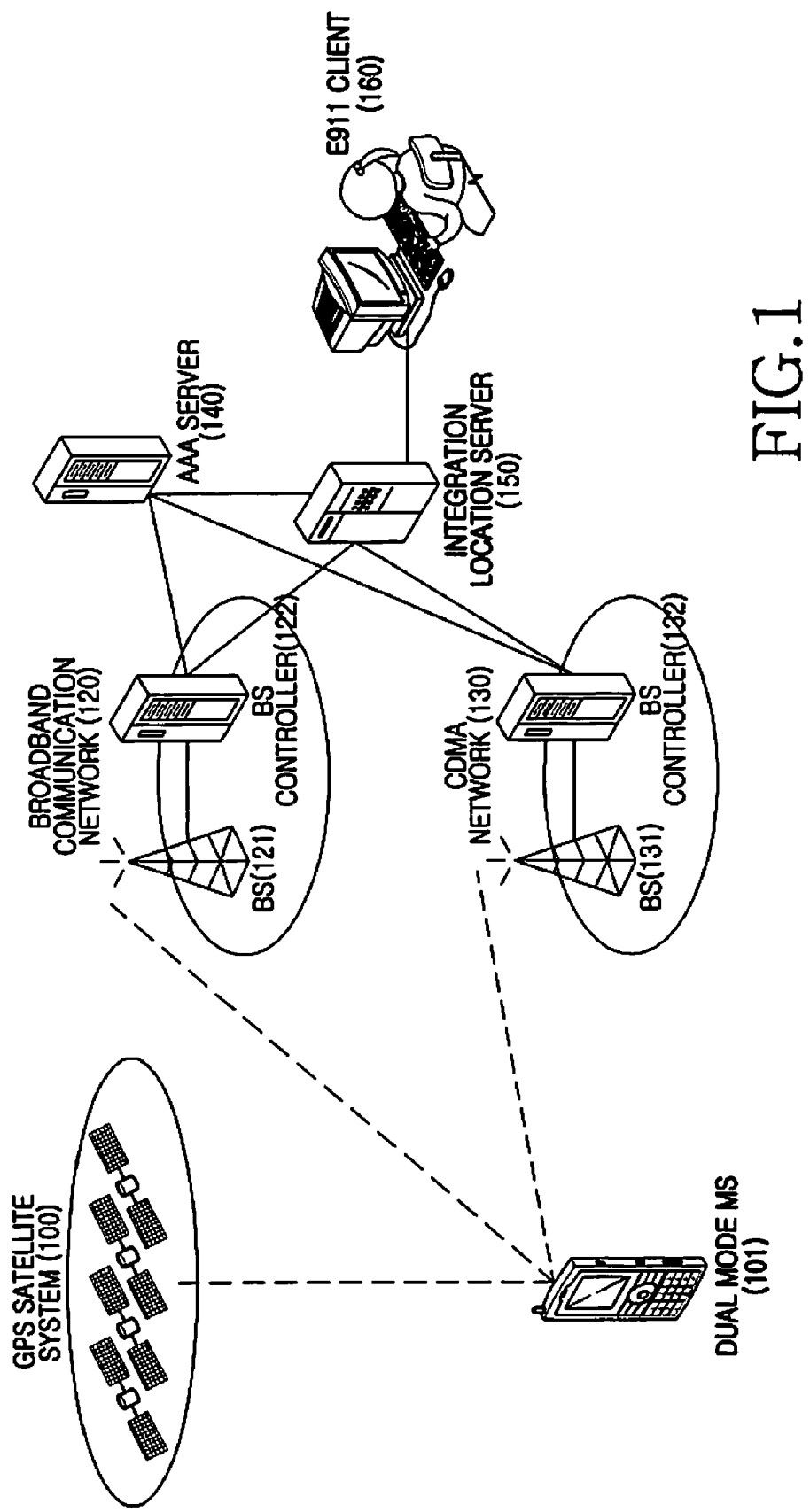
FIG. 1 is a diagram illustrating a system construction for providing an Assisted Global Positioning System (AGPS) during Enhanced 911 (E911) emergency service in a communication system according to an embodiment of the present invention.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described below, which are defined considering functions in the present invention, can be different depending on user and operator's intention or practice. Therefore, the terms should be defined on the basis of the disclosure throughout this specification.

An apparatus and method for supporting an Assisted Global Positioning System (AGPS) during Enhanced 911 (E911) emergency service in a communication system are described below.

FIG. 1 is a diagram illustrating a system construction for supporting an AGPS during E911 emergency service in a communication system according to an embodiment of the present invention.

Referring to FIG. 1, the system construction includes a Global Positioning System (GPS) satellite system 100, a dual mode Mobile Station (MS) 101, a broadband wireless communication network 120, a Code Division Multiple Access (CDMA) wireless communication network 130, an Authentication, Authorization, and Accounting (AAA) server 140, an integration location server 150, and an E911 client 160.

The broadband communication network 120 includes a Base Station (BS) 121 and a BS controller 122. Likewise, the CDMA communication network 130 includes a BS 131 and a BS controller 132. The AAA authentication server 140 can operate in association with both the broadband communication network 120 and the CDMA communication network 130. The AAA server 140 stores MS authentication information, access state, and capacity information. The integration location server 150 processes and manages a request for a location of an MS, calculates the MS location, etc. The E911 client 160 performs a function of an E911 call center requesting and informing a location of an MS during an emergency call.

The dual mode MS 101 sends a notification of location information received from the GPS satellite system 100, to the BS 131 using a built-in AGPS chip. For example, the dual mode MS 101 collects a measurement value for positioning from an artificial satellite and a wireless network BS, and measures a location or transmits the collected information to a GPS. The GPS measures a location of an MS using location information sent by the dual mode MS 101 and information generated from the BS 131. An operation of an MS is described in detail in FIG. 2 below, and operation of the system is described in FIGS. 3-8 below.

Figure 2:
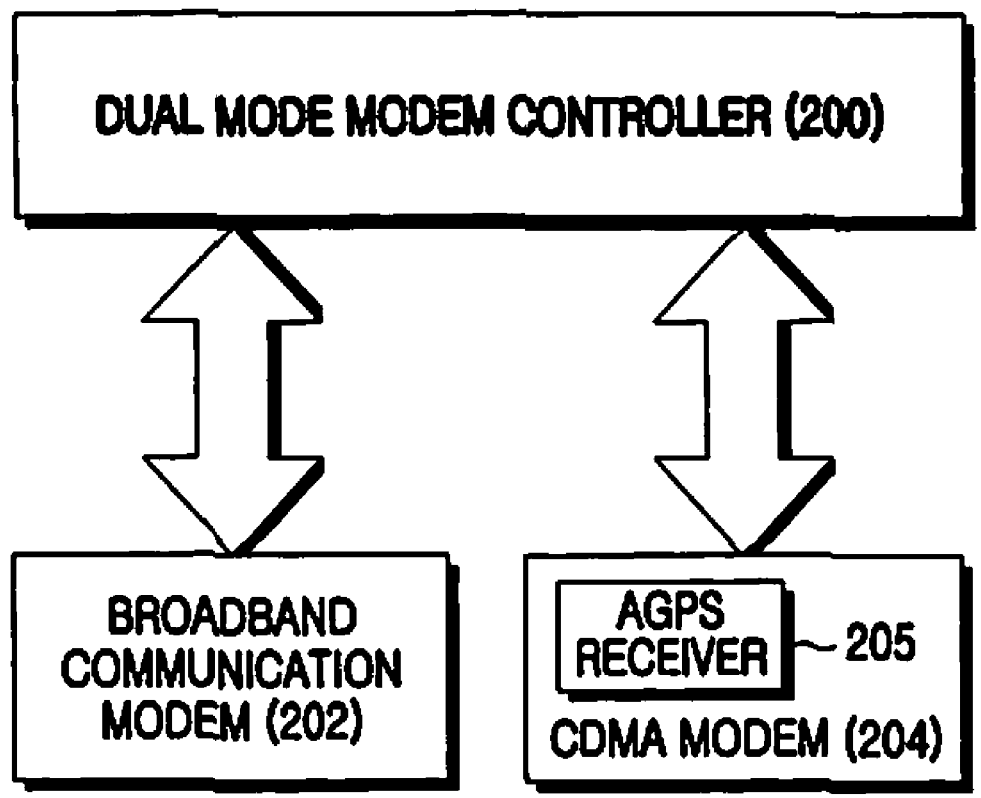
FIG. 2 is a block diagram illustrating a dual mode Mobile Station (MS) apparatus for providing an AGPS in a communication system according to an embodiment of the present invention.

FIG. 2 is a block diagram illustrating a dual mode MS apparatus for supporting an AGPS in a communication system according to an embodiment of the present invention.

Referring to FIG. 2, a dual mode MS is accessible to a broadband wireless communication network and/or a CDMA wireless communication network. The dual mode MS includes a broadband communication modulator/demodulator (modem) 202, a CDMA communication modem 204, and a dual mode modem controller 200 for controlling the two modems. The dual mode modem controller 200 includes both a hardware connection between the two modems and a software driver. For example, when there is a request for E911 emergency service in a state where the broadband communication modem 202 is activated and operated, the dual mode modem controller 200 activates and controls the CDMA communication modem 204 to perform an AGPS function. The broadband communication modem 202 has no AGPS function, but the CDMA communication modem 204 includes an AGPS receiver 205 for processing an AGPS function and an AGPS protocol. The AGPS receiver 205 can be provided outside the CDMA communication modem 204, but can perform an AGPS protocol operation only through the CDMA communication network 130.

The operation of an MS and a system for supporting an AGPS when there is a request for E911 emergency service and a CDMA communication modem with an AGPS function is inactivated in a dual mode MS accessible to a broadband communication network and/or a CDMA communication network is provided below with reference to FIGS. 3-8.

A first embodiment of the present invention involves an E911 request to a broadband communication network, in which a CDMA modem is activated and is AGPS operated and sends an E911 response to the broadband communication network. A second embodiment of the present invention involves an E911 request to a broadband communication network, in which a CDMA modem is activated and is CDMA AGPS operated and sends an E911 response to a CDMA communication network.

Figure 3A:
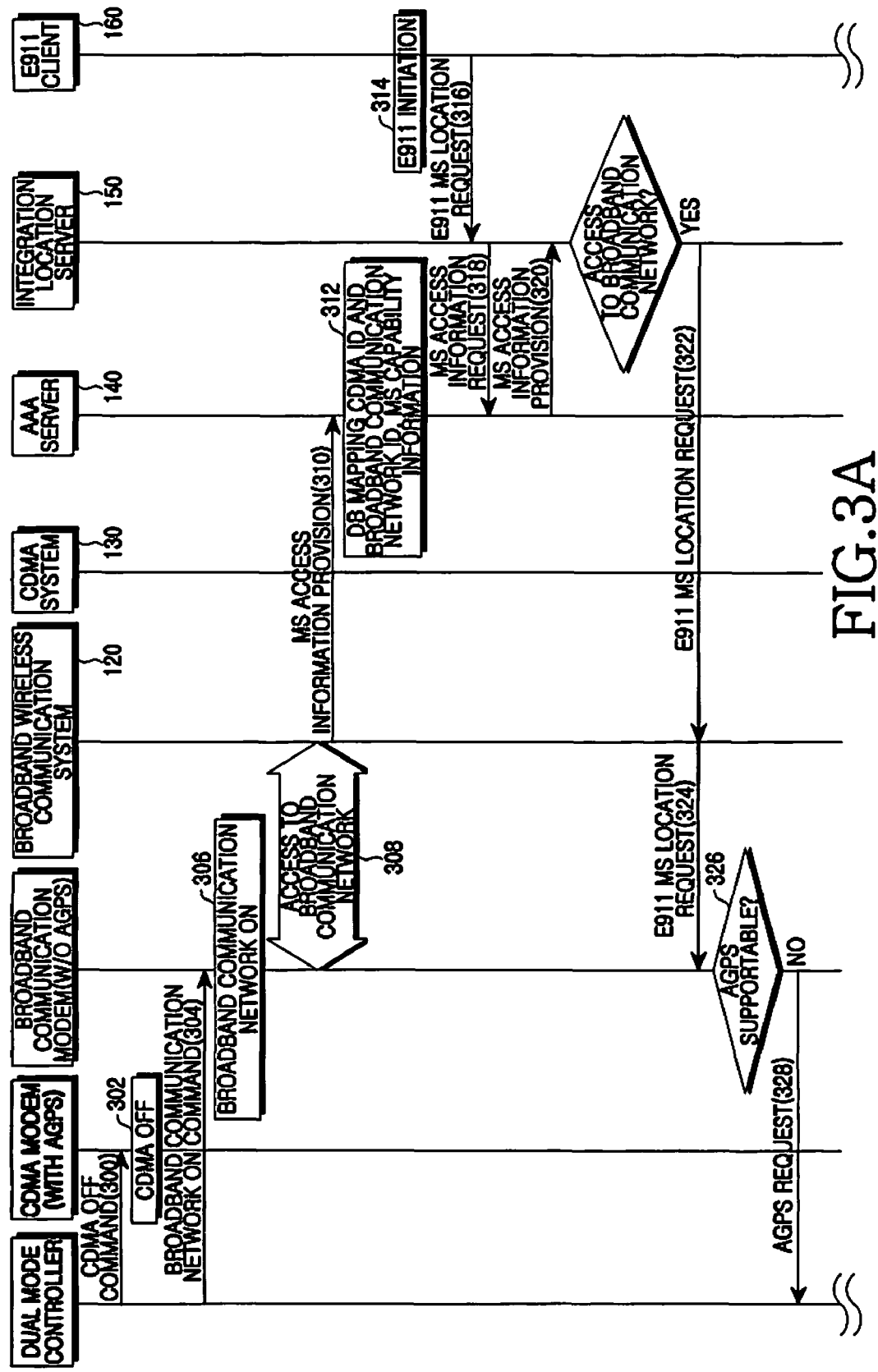
FIGS. 3A and 3B are ladder diagrams illustrating a signal flow for supporting an AGPS in a communication system according to a first embodiment of the present invention.
Figure 3B:
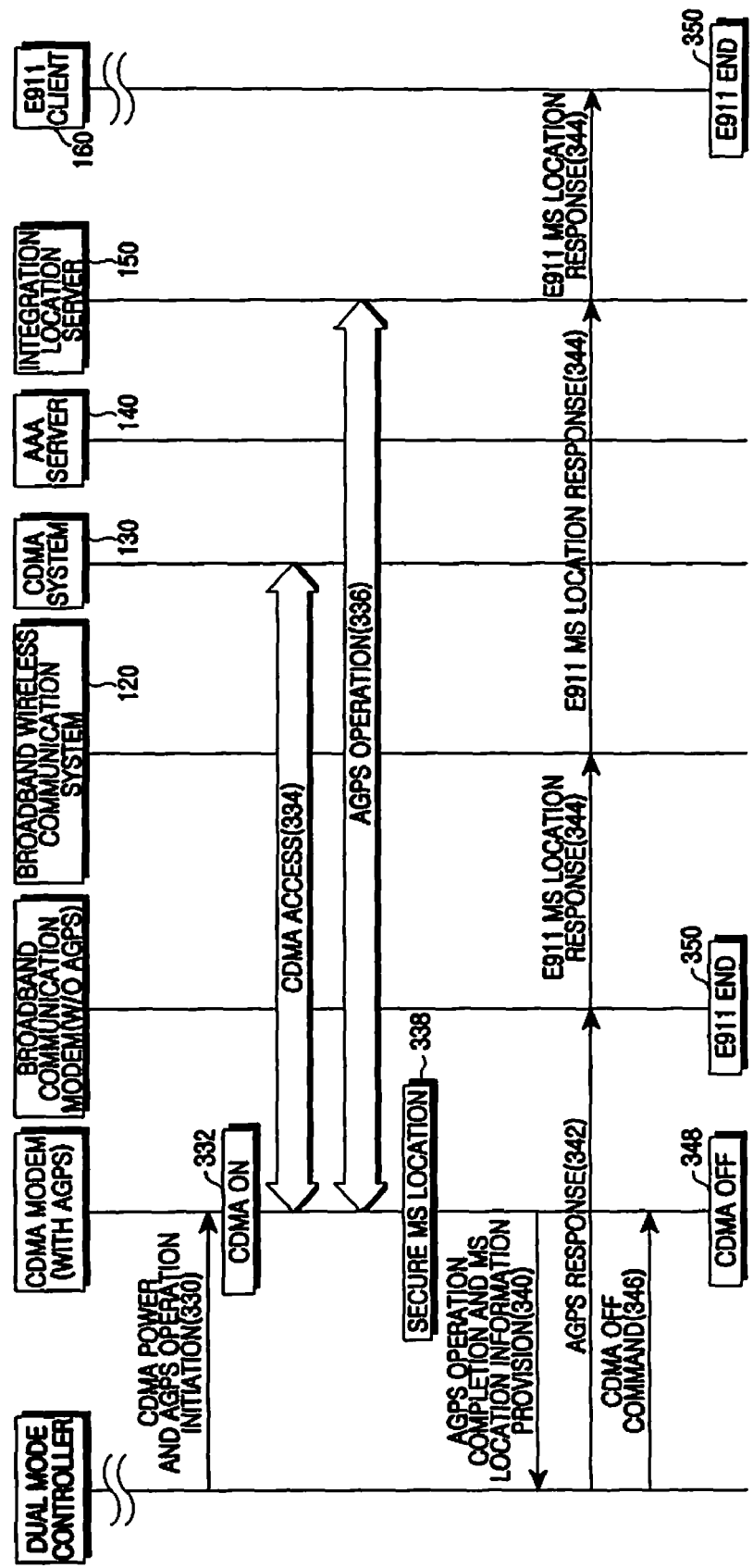

FIGS. 3A and 3B are ladder diagrams illustrating a signal flow for supporting an AGPS in a communication system according to a first embodiment of the present invention.

Referring to FIGS. 3A and 3B, when a dual mode MS accesses a broadband communication network and operates, a dual mode controller forwards a CDMA OFF command message to a CDMA modem to reduce power consumption in step 300. The CDMA modem is inactivated by receiving the CDMA OFF command message in step 302. The inactivation includes turning off hardware power or stopping software operation.

The dual mode controller transmits a broadband communication modem ON command message to a broadband communication modem in step 304. The broadband communication modem is activated by receiving the broadband communication modem ON command message in step 306.

In step 308, the dual mode MS accesses a broadband wireless communication system 120 through the broadband communication modem. In step 310, the broadband wireless communication system 120 provides MS access information to an AAA server 140. The AAA server 140 performs an authentication process using the MS access information. The MS access information includes MS access information to the broadband wireless communication system, MS capability information, and information on whether a current MS can support an AGPS, etc. In step 312, the AAA authentication server 140 keeps a DataBase (DB) for mapping a CDMA IDentifier (ID) and a broadband communication network ID. Thus, upon E911 request, an E911 client 160 can send an E911 request to an accessed system depending on a current access state of an MS using any one of the CDMA ID and the broadband communication network ID.

If initiating E911 in step 314, the E911 client 160 goes to step 316 and sends a request for a location of a corresponding MS to an integration location server 150. The integration location server 150 distinguishes an MS sought to obtain location information, through a CDMA ID or broadband communication network ID of the MS.

If there is a request for E911 emergency service from the E911 client 160, the integration location server 150 sends an MS access information request to the AAA server 140, in step 318. In step 320, the AAA server 140 provides corresponding MS access information to the integration location server 150. The MS access information includes information on a network to which a current MS is accessing, a capacity of the MS, etc.

The integration location server 150 identifies if a current MS is accessing any network and, in step 322, sends an E911 location request to the MS through an accessed network. If the current MS is accessing a broadband communication network, in step 324, the broadband communication modem of the current MS receives an E911 location request through the broadband wireless communication system 120.

Then, upon receiving an E911 location request through the broadband communication modem, in step 326, the dual mode MS identifies if it supports an AGPS function. In step 328, the broadband communication modem sends an AGPS request to the dual mode controller and activates the CDMA modem, because it does not support the AGPS function.

In step 330, the dual mode controller transmits a command message to the CDMA modem to activate the CDMA modem and initiate an AGPS operation.

In step 332, the CDMA modem converts to an active state from an inactive state. The activated broadband communication modem may maintain an active state, or may be inactivated while the CDMA modem operates. Thus, the CDMA modem accesses a CDMA system 130 in step 334, performs an AGPS operation in step 336, and then secures a location of an MS in step 338.

In step 340, the CDMA modem provides AGPS operation completion and acquired MS location information to the dual mode controller.

The dual mode controller sends an AGPS response message to the broadband communication modem in step 342 and the broadband communication modem sends an MS location response to the E911 client 160 through the broadband wireless communication system 120 and the integration location server 150 in step 344.

Upon completion of an operation of the CDMA modem, in step 346, the dual mode controller transmits a CDMA OFF command to reduce power consumption and, in step 348, converts the CDMA modem to an inactive state.

Then, in step 350, the E911 emergency service is terminated.

Figure 4:
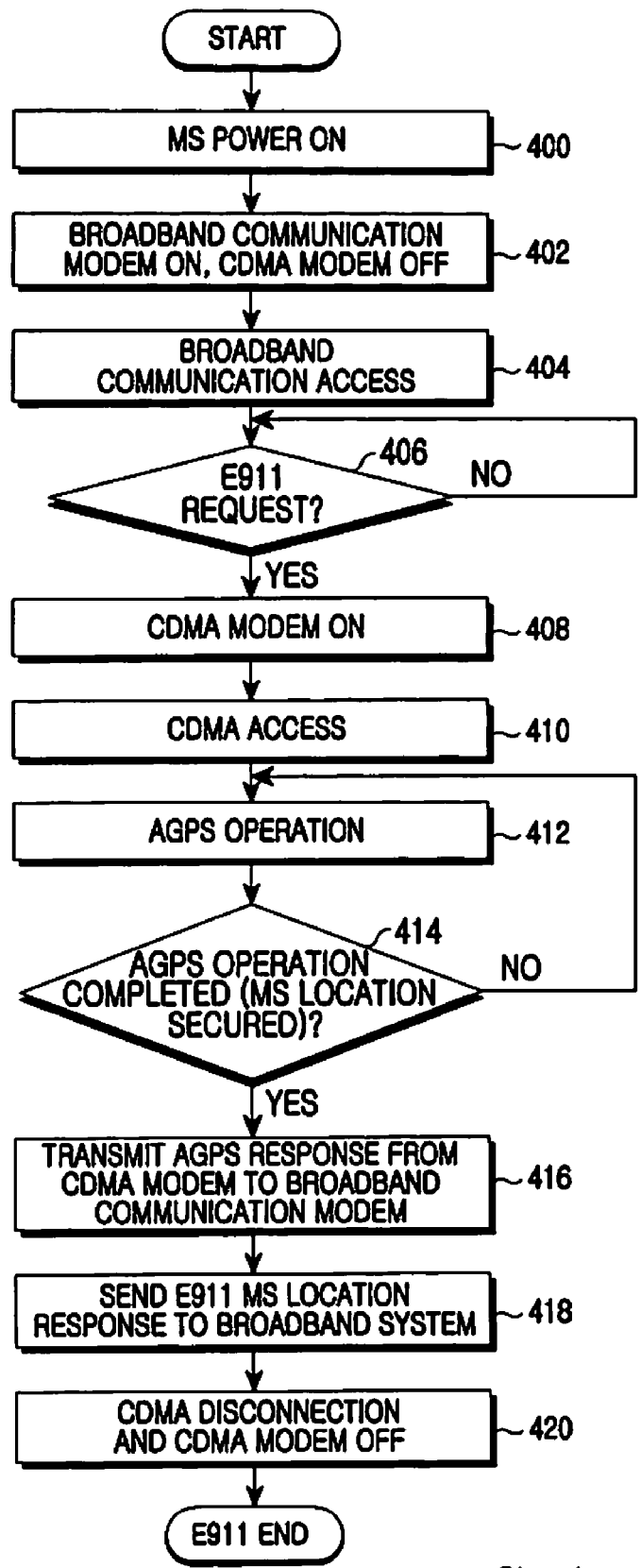
FIG. 4 is a flow diagram illustrating an MS operation for supporting an AGPS in a communication system according to a first embodiment of the present invention.

FIG. 4 is a flow diagram illustrating an MS operation for supporting an AGPS in a communication system according to the first embodiment of the present invention.

Referring to FIG. 4, a dual mode MS powers on in step 400 and, upon operating in a broadband wireless communication network, activates a broadband communication modem and inactivates a CDMA modem to reduce power consumption. The inactivation includes both turning off hardware power and stopping software operation.

In step 404, the dual mode MS accesses the broadband communication network through the activated broadband communication modem.

In step 406, the dual mode MS identifies if there is a request for E911 emergency service. If there is a request for E911 emergency service from the MS through the broadband wireless communication network, the dual mode MS activates the CDMA modem in step 408. The CDMA modem is activated because the broadband communication modem does not support an AGPS function. If there is not a request for E911 emergency service, the dual mode MS maintains an access state to the broadband communication network through the activated broadband communication modem.

In step 410, the dual mode MS accesses a CDMA wireless network through the CDMA modem and then, in step 412, performs an AGPS operation and seeks an MS location.

If it is determined that the AGPS operation is completed in step 414, the dual mode MS provides the MS location information, which is sought through the AGPS operation, to the broadband communication modem from the CDMA modem in step 416. If it is determined that the AGPS operation is not completed in step 414, the dual mode MS returns to step 412.

In step 418, the dual mode MS sends a notification of a location of an MS to a broadband wireless communication system through the broadband communication modem.

In step 420, the dual mode MS disconnects from the CDMA wireless communication network, and converts the CDMA modem to an inactive state to reduce power consumption.

The dual mode MS then terminates the E911 emergency service.

Figure 5:
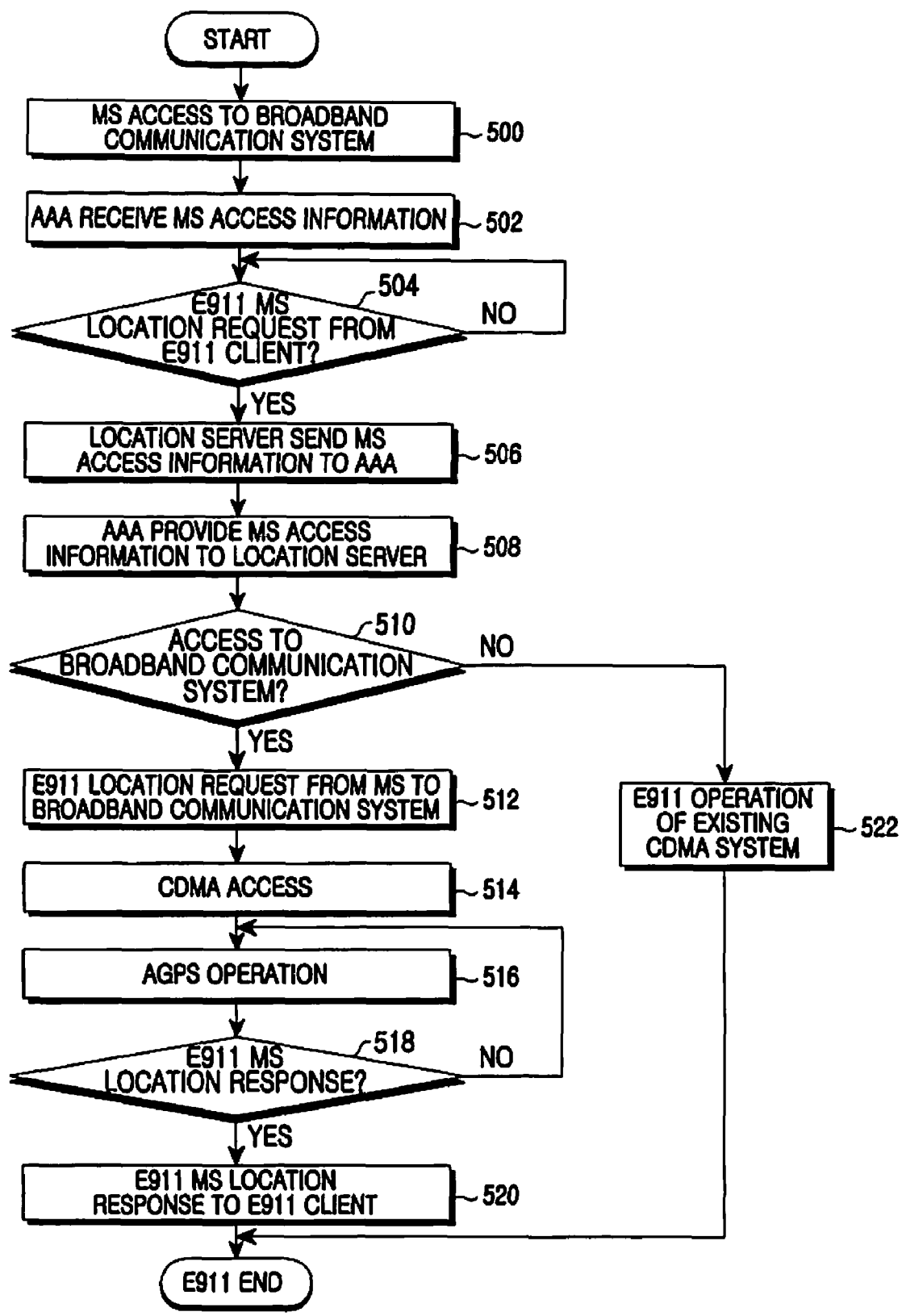
FIG. 5 is a flow diagram illustrating a system signal for supporting an AGPS in a communication system according to a first embodiment of the present invention.

FIG. 5 is a flow diagram illustrating a system signal for supporting an AGPS in a communication system according to the first embodiment of the present invention.

Referring to FIG. 5, in step 500, a broadband communication system grants access from a dual mode MS.

In step 502, an AAA server 140 receives MS access information from the broadband communication system and performs authentication. The MS access information includes MS access information to a network, MS capability information, and information on whether a current MS can support an AGPS, etc. The AAA server 140 keeps a DB for mapping a CDMA ID and a broadband wireless communication ID. Thus, when there is an E911 request from an E911 client 160, using any one of the CDMA ID and the broadband wireless communication ID, the AAA server 140 can send an E911 request to an accessed system depending on a current access state of an MS.

In step 504, upon initiating E911, the E911 client sends a request for a location of a corresponding MS to an integration location server. At this time, the integration location server distinguishes an MS sought to obtain location information, through a CDMA ID or broadband communication network ID of the MS.

If there is an E911 MS location request from the E911 client in step 504, the integration location server sends an MS access information request to the AAA server in step 506. If there is not an E911 MS location request, the integration location server repeatedly performs step 504. In step 508, the AAA server provides MS access information to the integration location server.

If is determined that a current MS is accessing a broadband communication network in step 510, the integration location server sends an E911 location request to the MS through the broadband communication network in step 512. If the MS is accessing a CDMA wireless network, the integration location server performs an E911 operation of an existing CDMA system in step 522.

The MS accesses a CDMA wireless network in step 514 and then, performs an AGPS operation in step 516.

It is determined whether the integration location server identifies an E911 MS location response through a broadband wireless communication system in step 518. If the E911 MS location response is identified, the integration location server sends the E911 MS location response to the E911 client in step 520. If an E911 MS location response is not identified, the integration location server returns to step 516.

The E911 emergency service is then terminated.

Figure 6A:
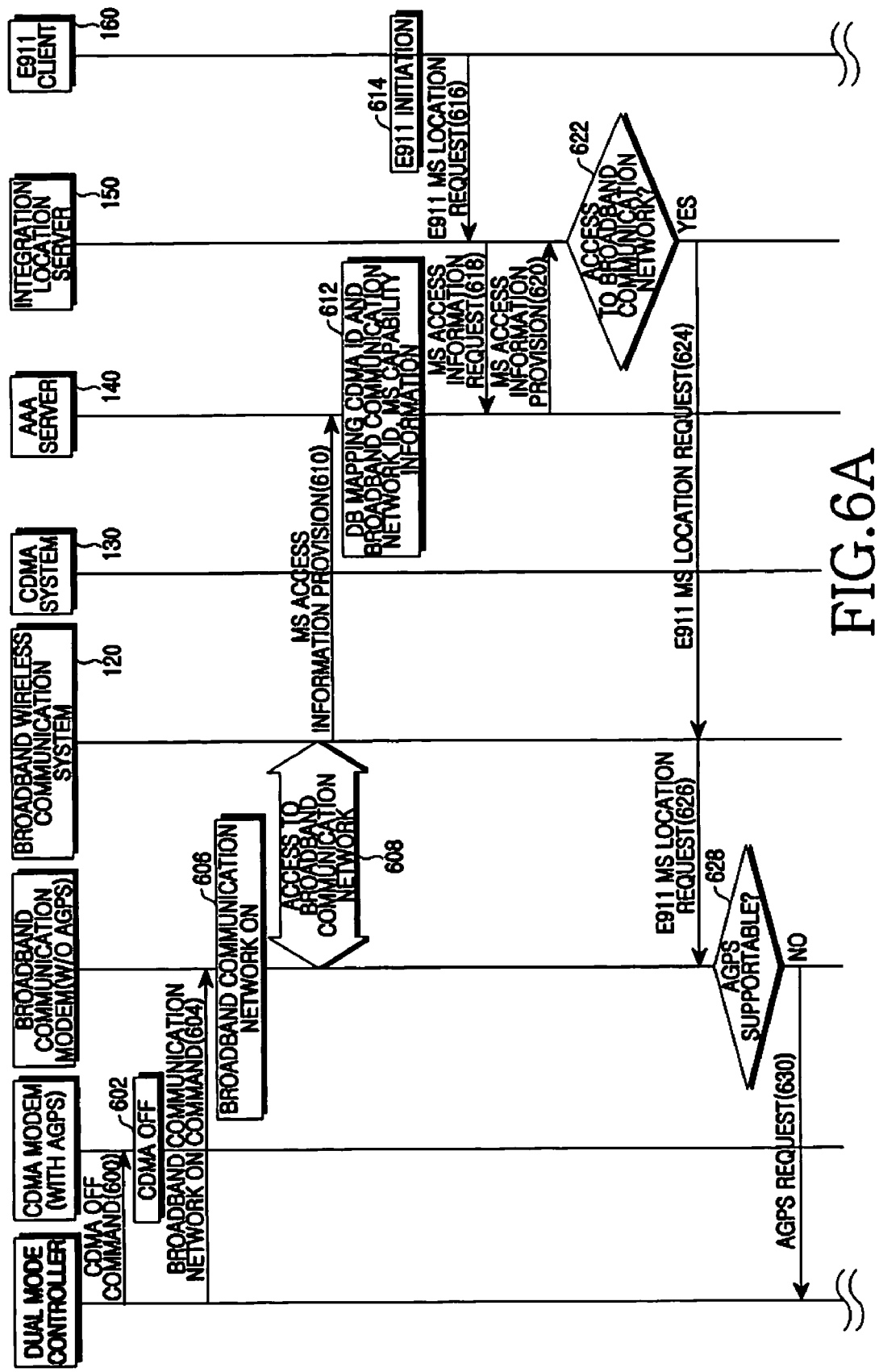
FIGS. 6A and 6B are ladder diagrams illustrating a signal flow for supporting an AGPS in a communication system according to a second embodiment of the present invention.
Figure 6B:
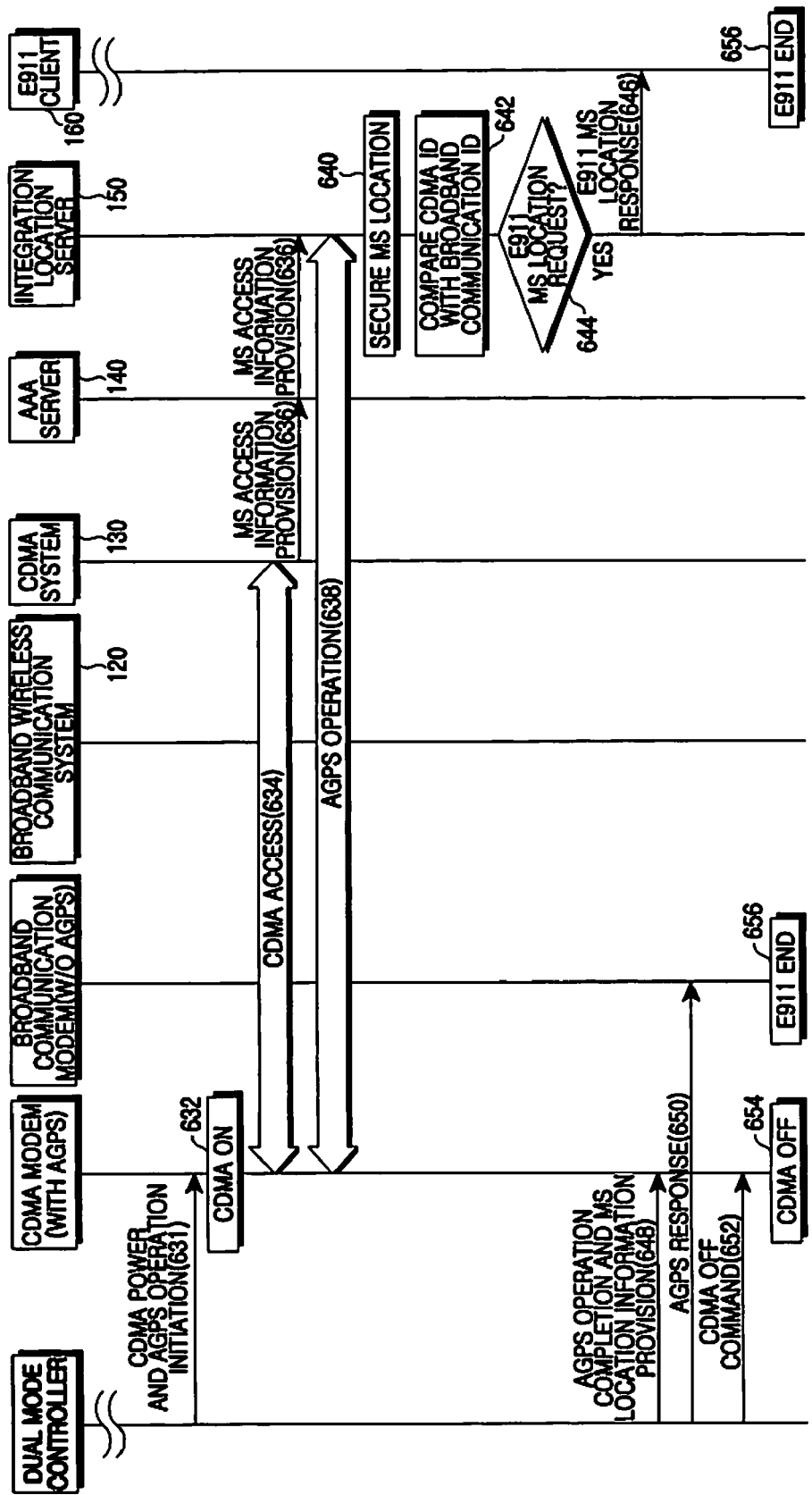

FIGS. 6A and 6B are a ladder diagrams illustrating a signal flow for supporting an AGPS in a communication system according to a second embodiment of the present invention.

When a dual mode MS accesses a broadband communication network and operates, a dual mode controller forwards a CDMA OFF command message to a CDMA modem to reduce power consumption in step 600. The CDMA modem is inactivated by receiving the CDMA OFF command message in step 602. The inactivation includes both turning off hardware power and stopping software operation.

The dual mode controller transmits a broadband communication modem ON command message to a broadband communication modem in step 604. The broadband communication modem is activated by receiving the broadband communication modem ON command message in step 606.

In step 608, the dual mode MS accesses a broadband wireless communication system 120 through the broadband communication modem. In step 610, the broadband wireless communication system 120 provides MS access information to an AAA server 140. The AAA authentication server 140 performs an authentication process using the MS access information. The MS access information includes MS access information to the broadband wireless communication system, MS capability information, and information on whether a current MS can support an AGPS, etc. In step 612, the AAA authentication server 140 keeps a DataBase (DB) for mapping a CDMA IDentifier (ID) and a broadband communication network ID. Thus, upon receiving an E911 request, an E911 client 160 can send an E911 request to an accessed system depending on a current access state of an MS using any one of the CDMA ID and the broadband communication network ID.

If initiating E911 in step 614, the E911 client 160 goes to step 616 and sends a request for a location of a corresponding MS to an integration location server 150. At this time, the integration location server 150 distinguishes an MS sought to obtain location information, through a CDMA ID or broadband communication network ID of the MS.

If there is a request for E911 emergency service from the E911 client 160, the integration location server 150 sends an MS access information request to the AAA server 140, in step 618. In step 620, the AAA server 140 provides corresponding MS access information to the integration location server 150. The MS access information includes information on a network to which a current MS is in access, a capacity of the MS, etc.

In step 622, the integration location server 150 determines whether a current MS is accessing any network and, in step 624, sends an E911 location request to the MS through an accessed network. If the current MS is accessing a broadband communication network, in step 626, the integration location server 150 sends an E911 location request to the broadband communication modem of the MS through the broadband wireless communication system 120.

Upon receiving an E911 location request through the broadband communication modem, in step 628, the dual mode MS determines whether it supports an AGPS function. In step 630, the broadband communication modem sends an AGPS request to the dual mode controller and activates the CDMA modem, because it does not support the AGPS function.

In step 631, the dual mode controller transmits a command message to the CDMA modem to activate the CDMA modem and initiate an AGPS operation.

In step 632, the CDMA modem converts to an active state from an inactive state. The activated broadband communication modem may maintain an active state, or may be inactivated while the CDMA modem operates. Thus, in step 634, the CDMA modem accesses a CDMA system 130.

In step 636, the CDMA system 130 forwards CDMA access information on an MS to the integration location server 150 through the AAA authentication server 140.

In step 638, the CDMA modem performs an AGPS operation.

If the AGPS operation is completed, the integration location server 150 acquires a location of an MS in step 640, compares a CDMA ID with a broadband wireless communication ID in step 642, and determines if there is an E911 request of the MS in step 644. If there is an E911 request, the integration location server 150 sends an MS location response to the E911 client in step 646.

After the AGPS operation is completed, in step 648, the CDMA modem provides AGPS operation completion and acquired MS location information to the dual mode controller. Then, in step 650, the dual mode controller sends an AGPS response to the broadband communication modem, thus informing the end of the E911 operation. At this time, acquired MS location information is, if any, provided together, thus being used in the broadband communication modem. Then, if an operation of the CDMA modem is completed, in step 652, the dual mode controller forwards a CDMA OFF command to the CDMA modem to reduce power consumption and, in step 654, converts the CDMA modem to an inactive state.

In step 656, the E911 emergency service is terminated.

Figure 7:
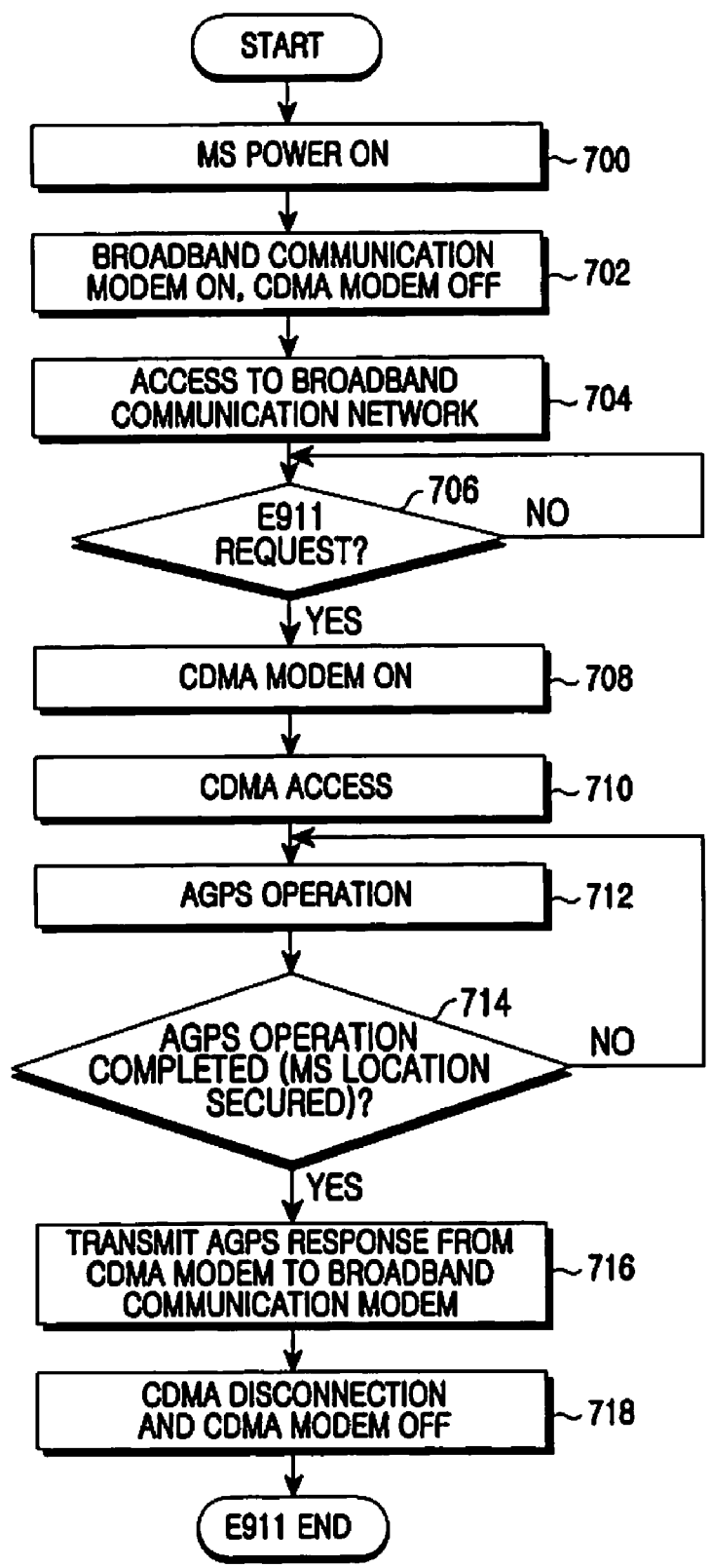
FIG. 7 is a flow diagram illustrating an MS operation for supporting an AGPS in a communication system according to a second embodiment of the present invention.

FIG. 7 is a flow diagram illustrating an MS operation for supporting an AGPS in a communication system according to the second embodiment of the present invention.

Referring to FIG. 7, a dual mode MS powers on in step 700 and, upon operating in a broadband wireless communication network, activates a broadband communication modem and inactivates a CDMA modem to reduce power consumption. The inactivation includes both turning off hardware power and stopping software operation.

In step 704, the dual mode MS accesses the broadband communication network through the activated broadband communication modem.

In step 706, the dual mode MS determines whether there is a request for E911 emergency service. If there is a request for E911 emergency service from the MS through the broadband wireless communication network, the dual mode MS activates the CDMA modem in step 708. The CDMA modem is activated because the broadband communication modem does not support an AGPS function. If there is not a request for E911 emergency service, the dual mode MS maintains an access state to the broadband communication network through the activated broadband communication modem.

In step 710, the dual mode MS accesses a CDMA wireless network through the CDMA modem and then, in step 712, performs an AGPS operation and secures an MS location.

If it is determined that the AGPS operation is completed in step 714, the dual mode MS provides the MS location information, which is secured through the AGPS operation, to the broadband communication modem from the CDMA modem in step 716. If it is determined that the AGPS operation is not completed in step 714, the dual mode MS returns to step 712. The dual mode controller sends an AGPS response to the broadband communication modem, thus informing the end of the E911 operation. At this time, acquired MS location information is, if any, provided together, thus being used in the broadband communication modem.

In step 718, the dual mode MS disconnects from the CDMA wireless communication network, and converts the CDMA modem to an inactivation state to reduce power consumption.

The dual mode MS terminates the E911 emergency service.

In the first embodiment of FIG. 4, the dual mode MS sends a notification of an MS location to a broadband wireless communication system through the broadband communication modem. However, in the second embodiment of FIG. 7, the dual mode MS sends a notification of an E911 MS location through a CDMA communication network, not a broadband wireless communication system.

Figure 8:
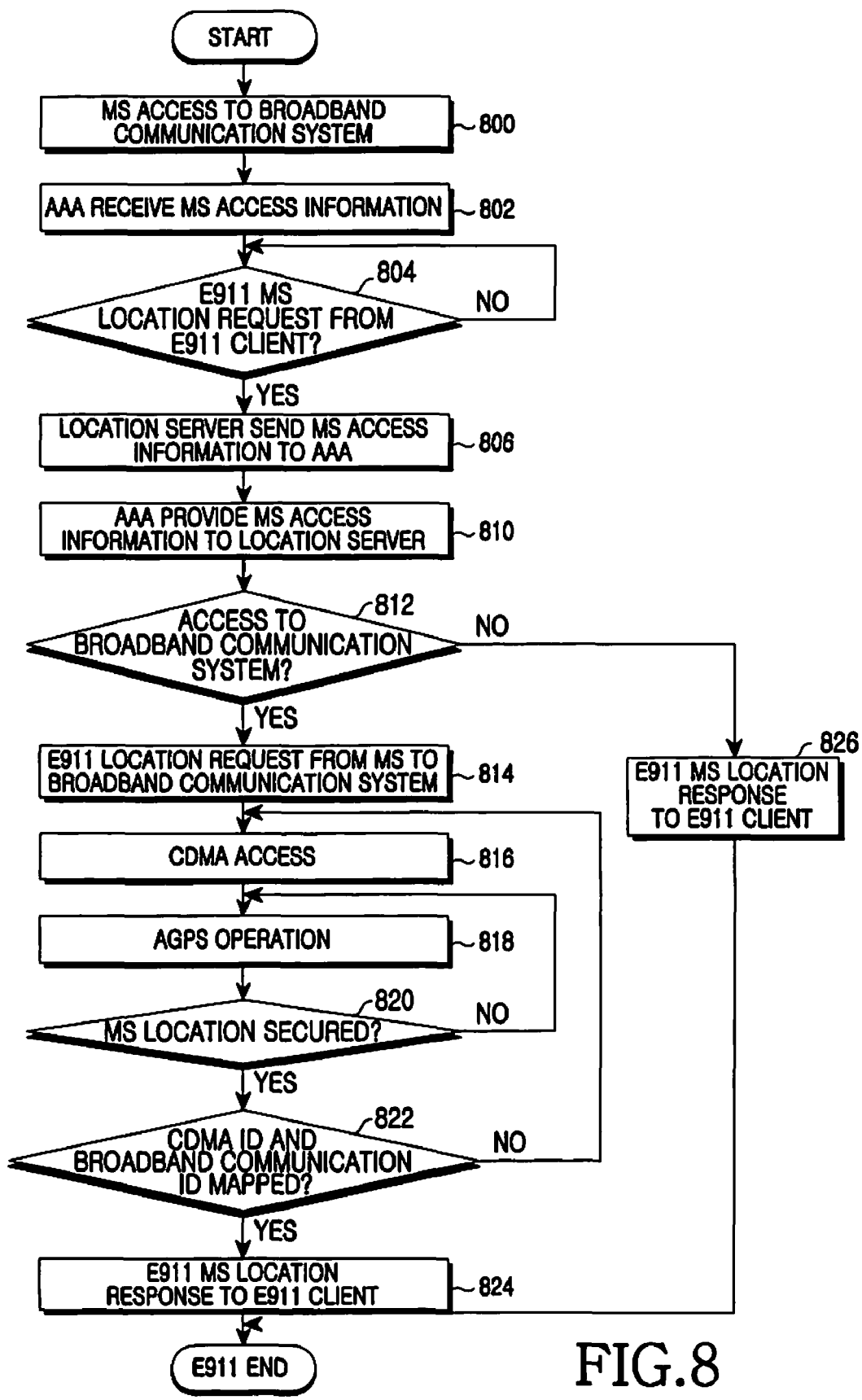
FIG. 8 is a flow diagram illustrating a system signal for supporting an AGPS in a communication system according to a second embodiment of the present invention.

FIG. 8 is a flow diagram illustrating a system signal for supporting an AGPS in a communication system according to the second embodiment of the present invention.

Referring to FIG. 8, in step 800, a broadband communication system grants access from a dual mode MS.

In step 802, an AAA authentication server receives MS access information from the broadband communication system and performs authentication. The MS access information includes MS access information to a network, MS capability information, and information on whether a current MS can support an AGPS, etc. The AAA authentication server keeps a DB for mapping a CDMA ID and a broadband wireless communication ID. Thus, upon E911 request, an E911 client can send an E911 request to an accessed system depending on a current access state of an MS using any one of the CDMA ID and the broadband communication network ID.

If it is determined that there is an E911 MS location request from the E911 client in step 804, the integration location server sends an MS access information request to the AAA authentication server in step 806. If it is determined that there is not an E911 MS location request, the integration location server repeatedly performs step 804. In step 810, the AAA authentication server provides MS access information to the integration location server.

If it is determined that a current MS is accessing a broadband communication network in step 812, the integration location server sends an E911 location request to the MS through the broadband communication network in step 814. If it is determined that the MS is accessing a CDMA wireless network in step 812, the integration location server performs an E911 operation of an existing CDMA system in step 826.

The MS accesses a CDMA wireless network in step 816 and then, performs an AGPS operation in step 818.

If the AGPS operation is completed, in step 820, the integration location server determines if an MS location is secured and, in step 822, compares a CDMA ID with a broadband wireless communication ID to determine if there is an E911 request from a corresponding MS. If there is an E911 request, in step 824, the integration location server sends an MS location response to an E911 client. If the MS location is not secured in step 820, the integration location server returns to step 818. And, if there is no E911 request in step 822, the integration location server returns to step 816.

The E911 emergency service is then terminated.

As described above, the present invention has an advantage that, when a CDMA modem with an AGPS function is inactivated and only a broadband communication modem without an AGPS function is activated and is in operation in a dual mode MS, the inactivated CDMA modem is activated and operated, thus being capable of providing an AGPS during E911 emergency service irrespective of a communication mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication system for supporting an Assisted Global Positioning System (AGPS) during emergency service, the system comprising:
   a client for requesting Mobile Station (MS) location information for emergency service;
   an integration location server for receiving access information on a corresponding MS from an authentication server in response to the MS location information request, and sending a location information request to the corresponding MS; and
   a dual mode MS for receiving the location information request through a first communication modem, activating a second communication modem, and performing an AGPS operation with the integration location server.

2. The system of claim 1, wherein the dual mode MS comprises the first communication modem and the second communication modem, the second communication modem comprises an AGPS function, and the first communication modem does not comprise an AGPS function.

3. The system of claim 1, wherein location information derived from the AGPS operation is transmitted to the client through the first communication modem of the dual mode MS.

4. The system of claim 1, wherein location information derived from the AGPS operation is transmitted to the client through the integration location server.

5. The system of claim 1, wherein, after performing the AGPS operation, the dual mode MS inactivates the second communication modem.

6. The system of claim 1, wherein, before receiving the location information request, the dual mode MS inactivates the second communication modem and accesses a corresponding network through the first communication modem.

7. The system of claim 1, wherein the authentication server comprises a database for mapping an IDentifier (ID) for the first communication modem and an ID for the second communication modem.

8. A method for supporting an Assisted Global Positioning System (AGPS) during emergency service in a communication system, the method comprising:
requesting MS location information for emergency service by a client;
receiving access information on a corresponding MS at an integration location server from an authentication server in response to the MS location information request, and sending a location information request from the integration location server to the corresponding MS; and
receiving the location information request at a dual mode MS through a first communication modem, activating a second communication modem, and performing an AGPS operation with the integration location server.

9. The method of claim 8, wherein the second communication modem comprises an AGPS function, and the first communication modem does not comprise an AGPS function.

10. The method of claim 8, further comprising transmitting the location information derived from the AGPS operation, to the client through the first communication modem of the dual mode MS.

11. The method of claim 8, further comprising transmitting the location information derived from the AGPS operation, to the client through the integration location server.

12. The method of claim 8, after performing the AGPS operation, further comprising inactivating the second communication modem.

13. The method of claim 8, further comprising, before requesting the MS location information for emergency service, inactivating the second communication modem and accessing a corresponding network through the first communication modem by the dual mode MS.

14. The method of claim 8, wherein the authentication server comprises a database for mapping an IDentifier (ID) for the first communication modem and an ID for the second communication modem.

15. An apparatus for supporting an Assisted Global Positioning System (AGPS) during emergency service in a dual mode Mobile Station (MS), the apparatus comprises:
a first communication modem for accessing a first communication network and receiving an MS location information request for emergency service;
a dual mode modem controller for activating a second communication modem when the MS location information request for emergency service is received; and
the second communication modem for accessing a second communication network in response to the MS location information request for emergency service and performing an AGPS operation.

16. The apparatus of claim 15, wherein the first communication modem transmits a secured MS location to a network.

17. The apparatus of claim 15, wherein the second communication modem comprises an AGPS function, and the first communication modem does not comprise an AGPS function.

18. The apparatus of claim 15, wherein, after performing the AGPS operation, the dual mode modem controller inactivates the second communication modem.

19. A method for supporting an Assisted Global Positioning System (AGPS) during emergency service in a dual mode Mobile Station (MS), the method comprising the steps of:
accessing a first communication network through a first communication modem and receiving an MS location information request for emergency service;
activating a second communication modem, when the MS location information request for emergency service is received; and
accessing a second communication network in response to the MS location information request for emergency service and performing an AGPS operation.

20. The method of claim 19, further comprising transmitting an MS location, secured through the AGPS operation, to a network.

21. The method of claim 19, wherein the second communication modem comprises an AGPS function, and the first communication modem does not comprise an AGPS function.

22. The method of claim 19, further comprising inactivating the second communication modem, after performing the AGPS operation.

* * * * *